Sept. 5, 1967    G. FOELL ET AL    3,339,754
ATTACHMENT FOR FEEDING WORKPIECES TO MACHINE TOOLS
Filed May 24, 1965    3 Sheets-Sheet 2

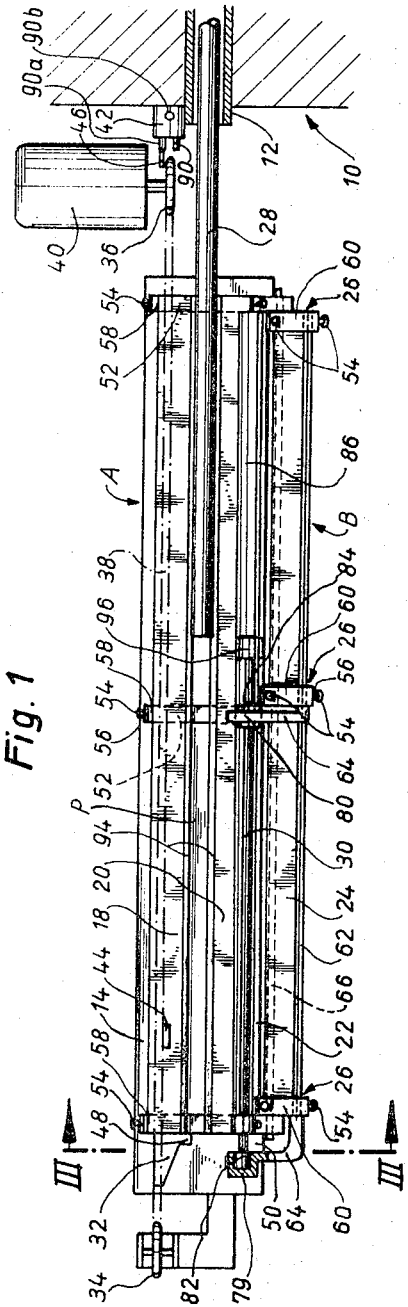

Inventors
Gerhard Föll
Martin Ebinger
by Michael J. Striker
Atty.

Sept. 5, 1967  G. FOELL ET AL  3,339,754
ATTACHMENT FOR FEEDING WORKPIECES TO MACHINE TOOLS
Filed May 24, 1965

Inventors
Gerhard Föll
Martin Ebinger
by Michael J. Striker
Atty

United States Patent Office 3,339,754
Patented Sept. 5, 1967

3,339,754
ATTACHMENT FOR FEEDING WORKPIECES
TO MACHINE TOOLS
Gerhard Foell, Esslingen (Neckar), and Martin Ebinger, Winnenden, Germany, assignors to Index-Werke KG. Hahn & Tessky, Esslingen (Neckar), Germany
Filed May 24, 1965, Ser. No. 458,109
Claims priority, application Germany, May 23, 1964,
J 25,891
13 Claims. (Cl. 214—1.4)

The present invention relates to machine tools in general, and more particularly to an improved attachment which may be utilized to feed elongated bar stock and similar workpieces to turning lathes and certain other types of machine tools.

In heretofore known attachments which are used to feed elongated bars and similar workpieces to a turning lathe or the like, the work supporting structure of the attachment normally comprises a pipe which is long enough to accommodate a complete workpiece, from end to end, and wherein a pusher or the like is movable axially to feed the workpiece into or toward the working station of the machine tool. The pipe is normally swingable about an axis which is parallel to its own axis so that it may be pivoted to a position in which a fresh workpiece or blanket may be inserted through the forward end of the pipe. During such insertion, the pusher is retracted toward or even beyond the rear end of the pipe in order to provide room for entry of a fresh workpiece.

A serious drawback of such conventional attachments is that they occupy too much room, not only as seen in the axial direction of the pipe but also transversely thereof. The axial length of the attachment at least equals the combined length of the longest workpiece plus the length of the pusher (which latter is often constructed as an elongated plunger or piston). Furthermore, and because the entire pipe must be swung to and from a position of registry with the working station of the machine tool, sufficient space must be left at one side of the attachment to allow for such pivotal movements of the pipe. Since the space is at a premium in any modern manufacturing plant, the aforedescribed conventional attachments failed to gain wide acceptance in the industry. Also, and since the fresh workpiece is inserted at the time the pipe is swung to its inoperative position, the return movement of such pipe to its operative position requires a substantial effort, especially if the workpieces are solid metallic rods of considerable length and large diameter.

Accordingly, it is an important object of the present invention to provide a very simple, compact, rugged and easy-to-handle attachment which occupies much less room than any such conventional attachments which are known to us at this time and which can be readily converted for feeding of relatively long, relatively short, comparatively thin or relatively heavy (large-diameter) metallic bars, rods, pipes, spindles, shafts, rails and similar workpieces or blanks of circular or other than circular cross-sectional outline.

Another object of the invention is to provide an attachment of the just outlined characteristics wherein a fresh workpiece or blank may be immediately inserted in such a way that it assumes a position in which it is ready to move axially or lengthwise toward and past the working station of a machine tool so that the workpiece need not be moved with the guide assembly which latter is used to insure that the workpiece remains in proper alignment with the machine tool.

A further object of the invention is to provide an attachment which is especially suited for use in connection with turning lathes for elongated rods or similar stock and wherein at least some of the feeding operations may be carried out in a fully automatic way.

A concomitant object of the invention is to provide an attachment of the above outlined type which may be readily and rapidly adjusted to accommodate elongated rods or bars of relatively large or relatively small diameter and wherein such adjustments may be carried out either by hand or by resorting to rudimentary tools and by entrusting the work to semiskilled persons.

Still another object of the instant invention is to provide a novel advancing and feeding mechanism for use in an attachment of the above outlined characteristics.

A further object of the invention is to provide a novel control system for regulating the sequence of operations which are necessary to prepare the attachment for insertion of a fresh workpiece and to operate the feeding mechanism at a rate and at intervals required by the set-up of the machine tool which treats the workpiece.

Another object of the invention is to provide a novel guide assembly which may be used in the improved attachment to properly support and guide the workpieces during insertion and during advance toward the working station of a turning lathe or another machine tool.

A further object of the invention is to provide a guide assembly which can be manipulated with a minimum of effort in order to prepare the attachment for insertion of a fresh workpiece and which can be automatically arrested and/or locked either in an operative position in which the workpiece is ready to advance toward the working station or in an idle or inoperative position in which it allows the attachment to receive a fresh workpiece.

Another object of the invention is to provide a drive for the advancing mechanism of the improved attachment and to construct the drive in such a way that the feeding mechanism which comes in actual contact with a workpiece in order to advance the latter toward the working station of a machine tool is automatically disengaged from the workpiece during treatment by one or more tools so that the feeding mechanism undergoes a minimum of wear because it need not share any such movements which must be performed by the workpiece during treatment at the working station. For example, the workpiece is often rotated during treatment by one or more turning tools, and such rotation could result in substantial wear on the feeding mechanism if the latter would remain in actual contact with the workpiece during such rotation.

Still another object of the invention is to provide an attachment of the above outlined characteristics which may be readily combined or associated with many types of existing machine tools, which can be readily transported or shifted from one machine tool to another, which can be used in connection with many different types of machine tools, and which can be made shorter than a workpiece which is being fed by such attachment into a machine tool.

Briefly stated, one feature of our invention resides in the provision of an attachment for feeding elongated rods and similar blanks or workpieces to the working stations of turning lathes or similar machine tools. Basically, the attachment comprises an elongated guide assembly or support including a fixed portion and a second portion which is preferably hingedly connected with and is movable with reference to the fixed portion between two spaced positions to respectively enclose or expose an elongated blank-receiving channel or passage so that a blank may be inserted into the channel when the second portion is moved to open position, shifting or feeding means carried by the second portion of the guide assembly and extending into the channel when the second portion is moved to its closing position, and advancing means including a preferably motor-driven motion transmitting member which engages the feeding means in the closing position of the second portion to move the feeding means in the channel and to the thereby effect axial or lengthwise movement of the blank toward a working station.

The guide assembly may resemble an elongated pipe or tube which is split in a plane extending through or parallel to its axis and one portion of which is rockable with reference to the other portion. Alternatively, the guide assembly may include two or more guide bars which form part of the fixed portion and one or more guide bars which form part of the movable portion and which may be moved into or out of engagement with a freshly inserted blank. Such freshly inserted blank is placed onto the stationary guide bars and is then automatically located in an optimum position for lengthwise movement to the working station of a machine tool.

The novel features which are considered as characteristic of the invention are set forth in particular in the appended claims. The improved attachment itself, however, both as to its construction and its mode of operation, together with additional features and advantages thereof, will be best understood upon perusal of the following detailed description of certain specific embodiments with reference to the accompanying drawings, in which:

FIG. 1 is a top plan view of an attachment which embodies one form of the present invention, the movable portion of the attachment being shown in open or idle position and a part of the machine tool being illustrated in horizontal section;

FIG. 2 illustrates the advancing means for a feed shaft which comes into actual engagement with a blank;

Figure 3:
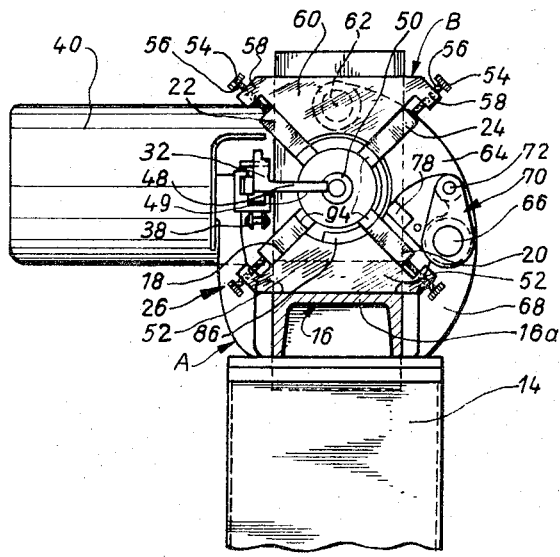
FIG. 3 is a transverse vertical section substantially as seen in the direction of arrows from the line III—III of FIG. 1 but showing the movable portion of the attachment in operative position.
Figure 4:
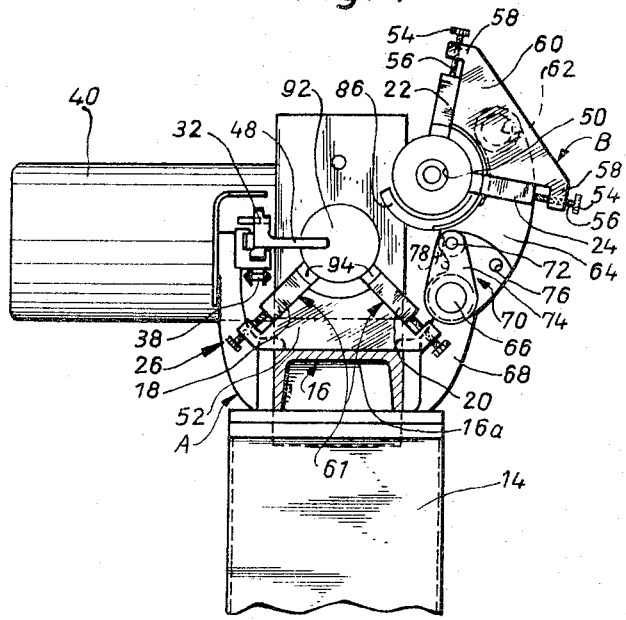
FIG. 4 is a similar section but showing the movable portion of the attachment in the idle or open position as in FIG. 1.

Referring to the drawings, and first to FIGS. 1, 3 and 4, there is shown an attachment which is utilized to feed elongated metallic rods or similar blanks 28 into the hollow spindle 12 of a machine tool 10, for example, a turning lathe. The working station of the lathe 10 is located to the right of FIG. 1, and its construction forms no part of the present invention. It suffices to say that the tool or tools of the lathe 10 will treat that portion of the blank 28 which is advanced through and beyond the spindle 12. The invention resides in the construction, mounting and operation of the attachment which accommodates, supports, guides and advances or feeds the blank 28 at a rate necessary for optimum operation of the lathe 10. This attachment comprises a fixed portion A and a second portion B. The second portion B is movable with reference to the fixed portion A so that one or more of its parts may engage or become disengaged from the blank 28 which is placed onto the fixed portion A. The fixed portion A comprises a stationary base or frame 14 (see FIGS. 3 and 4) which carries an elongated supporting rail 16. In the present instance, the rail 16 is of inverted U-shaped cross section and its web 16a is located in a horizontal plane, the two vertically extending flanges of the rail resting on the base 14. The fixed portion A of the attachment further includes a pair of elongated guide bars 18, 20 which are parallel with the rail 16 and are supported by fixed carriers 52 secured to the web 16a. The guide bars 18, 20 are located in planes which pass through the axis of the properly inserted blank 28 and may be moved radially inwardly or outwardly so as to advance nearer to or further away from such axis, depending on the diameter of the blank which latter is assumed to be a solid metallic rod of circular cross section. The means for adjusting and fixing the guide bars 18, 20 in selected positions comprises a series of adjusting devices 26, for example, three for each guide bar. FIG. 1 shows that two of the adjusting devices 26 are located at the respective ends of the corresponding guide bar and that the third adjusting device 26 engages and supports the median portion of the corresponding guide bar.

The second portion B of the attachment includes two elongated guide bars 22, 24 each of which is also controlled by three adjusting devices 26, and the guide bars 22, 24 engage the blank 28 when the second portion B is moved to the operative or closing position shown in FIG. 3 in which the guide bars 22, 24 are located diametrically opposite the bars 20, 18, respectively. In such closing position of the second portion B, the four guide bars 18, 20, 22, 24 are equidistant from each other and each thereof engages that length of the blank 28 which is accommodated in an elongated channel or passage P defined by the portion A, B. This channel P is preferably located in a horizontal plane and is long enough to further accommodate a shifting or feeding member here shown as an elongated feed shaft 30 secured to but being movably axially with reference to the second portion B. The front portion or head 96 of the feed shaft 30 can be moved into actual abutment with the rear end face of the blank 28, and this feed shaft may be moved in a direction to the right, as viewed in FIG. 1, to thereby feed the blank 28 into and through the spindle 12. The shaft 30 may be moved axially by an advancing mechanism including a motion transmitting member 32 which is connected to one stringer of an endless chain 38. The chain 38 is trained around sprockets 34, 36 (see particularly FIG. 2) which are mounted adjacent to the second portion B and may but need not be carried by the base 14 or rail 16. The sprocket 36 is driven by a reversible hydraulic motor 40 and the chain 38 carries two suitably spaced actuating members or trips 44, 46 which operate a control valve 42 for the motor 40, for example, a solenoid valve. The motion transmitting member 32 has a projection or arm 48 which extends into a slot 49 (see FIG. 3) between the portions A, B and can travel along the channel P to thereby entrain the feed shaft 30 when the second portion B is moved to such closing position in which the upper guide bars 22, 24 engage the blank 28. The rear end portion of the feed shaft 30 is provided with an annular groove 50 (see FIG. 2) which accommodates the tip of the arm 48 when the motion transmitting member 32 is properly coupled to the shaft 30 so that, when the motor 40 is driven in a sense to move the member 32 in a direction to the right, as viewed in FIG. 1 or 2, the heads 96 will push the blank 28 into and through the spindle 12 of the lathe 10. On the other hand, the feed shaft 30 may be uncoupled from the motion transmitting member 32 in response to movement of the second portion B into the inoperative or open position shown in FIG. 4 in which the channel P is exposed and is ready to receive a fresh blank, e.g., a solid rod 92. In the illustrated embodiment, the control valve 42 is mounted on the frame of the lathe 10, but it is obvious that this valve may be mounted on a stationary part of the attachment or on a separate support.

The second portion B of the improved attachment is pivotable about the axis of a fixed horizontal pivot shaft or pintle 66 which is mounted on the fixed portion A and is at least nearly parallel with the channel P. When the portion B is pivoted to the open position of FIG. 4, the upper part of the channel P is exposed so that the fresh blank 92 may be placed, either from above or from one side, onto the guide bars 18, 20, and more particularly onto suitable liners 94 secured to the upper end faces of the guide bars 18, 20. Similar liners 94 are provided along such end faces of the movable guide bars 22, 24 which come nearest to the blank 28 or 92 when the portion B is rocked back to the closing position of FIG. 3.

It will be seen that the diameter of the blank 92 shown in FIG. 4 exceeds substantially the diameter of the blank 28; therefore, prior to inserting the blank 92, the operator or operators will manipulate the adjusting devices 26 to move the guide bars 18, 20, 22 and 24 further away from the center of the channel P. FIGS. 1, 3 and 4 show that the adjusting devices 26 are of identical construction and each thereof comprises a threaded spindle 56 rotatable by a milled head or knob 54. The spindles 56 extend through tapped bores provided in brackets 58 forming part of the fixed carriers 52 and of movable carriers 60 which latter support the upper guide bars 22, 24. The tips of the spindles 56 are rotatably secured to the respective guide bars, and such bars are reciprocable radially of the blank 28 or 92 in suitable ways 61 provided in the carriers 52 and 60. It will be seen that the spindles 56 can move the liners 94 toward or away from the center of the channel P. Of course, it is equally possible to provide springs or the like which normally urge the guide bars 18, 20, 22 and 24 radially outwardly so that the spindles 56 need not be actually coupled to the respective bars but merely abut against the outer end faces of such bars. Each of the carriers 52, 60 supports two adjusting devices 26, and the carriers 60 are mounted on a common shaft 62 which is non-rotatably secured to one or more links 64 rockable on the pintle 66. The pintle 66 is mounted in brackets 68 carried by the fixed rail 16 or by the base 14. It will be seen that the portion B is hinged to the fixed portion A.

The attachment also comprises locking means 70 serving to hold the second portion B in the closing position of FIG. 3 but allowing this portion to move to the open position of FIG. 1 or 4. In the illustrated embodiment, the locking device 70 is constructed in such a way that it can arrest the second portion B in either of its end positions. As best shown in FIGS. 3 and 4, the locking device 70 comprises a holder 74 which is rigid with the fixed portion A and carries a spring-biased pin 72 which is reciprocable in the axial direction of the pintle 66. This pin may enter a hole or recess 76 provided in the link 64 of the second portion B when this second portion reaches the closing position of FIG. 3 and cooperates with the fixed portion A to guide and to support the blank 28 or 92 for axial movement through channel P. When the pin 72 is manually withdrawn from the hole 76, the second portion B may rocked to the open position of FIG. 1 or 4 whereby the pin 72 abuts against a stop 78 which is attached to the link 64 and travels in an arc about the axis of the pintle 66 when the portion B moves from the one to the other of its positions. It is clear that the stop 78 may be arranged to abut against another element of the fixed portion A and that the position of the pin 72 and hole or recess 76 may reversed.

When a fresh blank (e.g., the blank 92 shown in FIG. 4) is placed onto the liners 94 of the lower guide bars 18, 20, the blank may be advanced into the spindle 12 and into abutment with a suitable stop (not shown) while the second portion B remains in the open position of FIG. 4. Such shifting of the freshly inserted blank may be carried out by hand or by starting the motor 40 in a sense that the motion transmitting member 32 advances in a direction to the right, as viewed in FIG. 1, and its arm 48 engages the rear end face of the blank. Thus, a freshly inserted blank may be moved to a starting position by resorting to the motor 40 and through the intermediary of the motion transmitting member 32 so that the feed shaft 30 need not participate in such movement of the arm 48.

The means for attaching the feed shaft 30 to the movable portion B comprises two bearing members 79, 80 which are respectively adjacent to the rearmost and to the medium adjusting devices 26, see FIGS. 1 and 2. Prior to moving the second portion B to the open position of FIG. 1 or 4, the operator causes the arm 48 to return the feed shaft 30 to the rear end position (see FIG. 2) whereby a boss 82 at the rear end of the shaft 30 enters a complementary bore 79a provided in the bearing member 79. At the same time, a second boss 84 of the feed shaft 30 enters a complementary bore 80a of the bearing member 80. The members 79, 80 are attached to the second portion B, and therefore, whenever the portion B moves to the open position of FIGS. 1 or 4, the feed shaft 30 participates in such movement and is automatically lifted out of the channel P. Each of the carriers 60 further comprises an arcuate lifter 86 which straddles the adjacent portion of the feed shaft 30 and assists the bearing members 79, 80 in moving the feed shaft with the second portion B.

The attachment of our invention is operated as follows: When the blank 28 has been advanced to its foremost position and it becomes necessary to insert a fresh blank, the motor 40 is reversed in a fully automatic way because the trip 44 strikes against the corersponding valve member 90 of the control valve 42. The motor 40 then drives the chain 38 in such direction that the motion transmitting member 32 moves to the left, as viewed in FIG. 1 or 2, and retracts the feed shaft 30 to its rear end position in which the bosses 82, 84 respectively enter the bores 79a, 80a of the bearing members 79, 80. FIGS. 1 and 2 show the shaft 30 in such rear end position, i.e., the blank 28 shown in FIG. 2 is ready to be advanced through and beyond the channel P. In the illustrated embodiment, the positioning of the trip 44 is such that the head 96 of the feed shaft 30 may expel the rear end of the blank 28 beyond the right-hand end of the channel P.

As soon as the feed shaft 30 returns to the rear end position of FIG. 2, the motor 40 is arrested in a fully automatic way because the trip 46 engages the valve member 90a of the control valve 42. The operator then withdraws the pin 72 from the hole 76 so that the locking device 70 allows the second portion B to pivot about the axis of the spindle 66 and to move from the closed position of FIG. 3 to that shown in FIG. 4. The feed shaft 30 shares such movement because its bosses 82, 84 are received in the bores 79a, 80a of the bearing members 79, 80 which are connected with the second portion B and also because the feed shaft is engaged by the lifters 86. The second portion B is arrested in the open position of FIG. 4 because the stop 78 abuts against the pin 72 or against another part of the fixed portion A.

When the fresh blank is properly inserted in the channel P, i.e., when such fresh blank rests on the liners 94 of the lower guide bars 18, 20 which form part of the fixed portion A, the second portion B is simply swung back into the position of FIG. 3 and the spring-biased pin 72 automatically enters the hole 76 to lock the portion B in such closing position in which the liners 94 of the upper guide bars 22, 24 also engage the freshly inserted blank. If the diameter of the freshly inserted blank is different from the diameter of the blank 28, the operator or operators will manipulate the spindles 56 of the adjusting devices 26 in order to move the liners 94 nearer to or further away from the center of the channel P. As shown in FIG. 4, the diameter of the blank 92 is greater than the diameter of the blank 28; therefore, the spindles 56 must be rotated in a sense to move the guide bars 18, 20, 22 and 24 radially outwardly.

In the next step, the operator starts the motor 40 by actuating a member 90b of the valve 42 whereby the motor 40 drives the chain 38 in a sense to move the arm 48 of the motion transmitting member 32 in the slot 49 and to thereby entrain the feed shaft 30 in a direction to the right, i.e., toward the spindle 12 of the lathe 10. The arm 48 cannot prevent pivotal movements of the shaft 30 with the second portion B because its tip extends into a circumferentially complete groove 50 of the feed shaft 30 and because the axis of the shaft 30 remains parallel to the axis of the pintle 66 when the second portion B moves between the positions shown in FIGS. 3 and 4. It is clear that the position of the trips 44, 46 on the chain 38 may be adjusted so that the motor 40 will be arrested and/or reversed in response to a desired forward or return stroke of the motion transmitting member 32. As stated before, the position of the trip 44 shown in FIG. 2 has been selected in such a way that the head 96 may expel the entire blank 28 from and even beyond the right-hand end of the channel P.

The liners 94 preferably consist of non-metallic material, for example, of suitable wear-resistant plastic which might be at least slightly elastic to reduce noise and to yield if the blank 28 or 92 is not straight.

Figure 5:
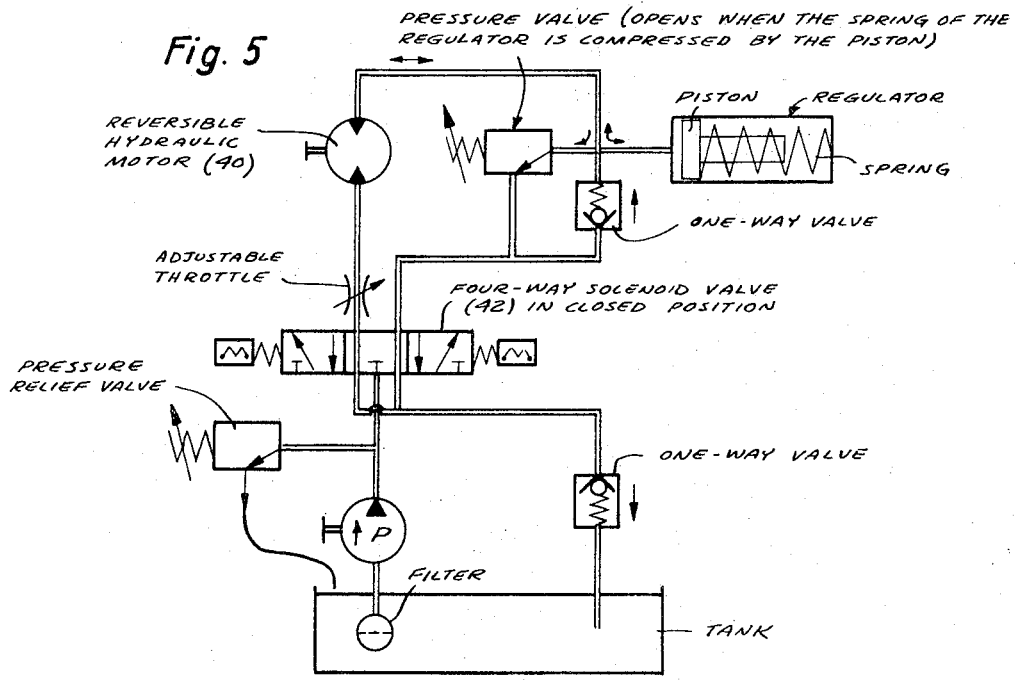
FIG. 5 illustrates the hydraulic circuit of the attachment.

The motor 40 may be operated intermittently so that the blank 28 or 92 is advanced at regular or irregular intervals, depending on the nature of operation which is performed by the lathe 10. In such attachments (i.e., when the blank 28 is fed intermittently), the motor 40 is preferably combined with a suitable regulator shown in FIG. 5 which causes the motor to reverse the direction of its rotation whenever the chain 38 comes to a halt so that the head 96 is moved a short distance away from the rear end face of the blank 28 or 92. This insures that the head 96 is disengaged from the blank when the latter is actually subjected to a turning or other action by one or more tools which are mounted at the working station of the lathe 10. The aforementioned regulator is installed in the hydraulic circuit of the motor 40 and control valve 42, and this regulator is constructed to operate in a fully automatic way, i.e., it will reverse the motor 40 in response to cessation of forward movement of the motion transmitting member 32 and feed shaft 30 in a manner as shown in FIG. 5. An important advantage of the regulator is that the head 96 of the feed shaft 30 undergoes little wear and that the attachment will not produce any noise when the tool or tools of the lathe 10 come in actual engagement with the blank 28 or 92. For example, it is often necessary that the blank should rotate with reference to the tools, and the rear end face of the blank would then rotate with reference to the head 96 of the feed shaft 30. The distance between the head 96 and the rear end face of the blank in the channel P may be minimal, for example, in the range of one or more millimeters, so that the blank will be shifted with a minimum of delay as soon as the motor 40 again drives the chain 38 in a sense to move the head 96 toward the spindle 12. The provision of the aforementioned regulator is of particular advantage in such types of attachments which are used in connection with machine tools wherein an elongated blank must be rotated during treatment by one or more tools. In other words, the regulator reduces or eliminates friction between the feed shaft and the blank when the feed shaft is stationary.

The overall length of the attachment shown in FIGS. 1, 3 and 4 is substantially less than the length of conventional attachments. The difference in length at least equals the length of the feed shaft 30.

Figure 6:
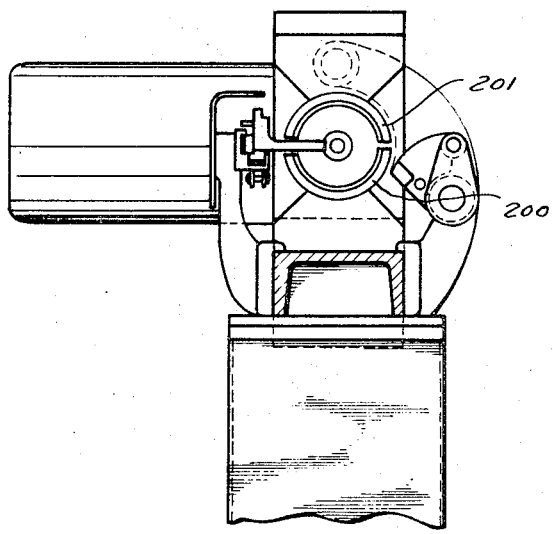
FIG. 6 illustrates a modified attachment in a view corresponding to that of FIG. 3.

It is clear that the attachment shown in FIGS. 1–4 is susceptible of many modifications without departing from the spirit of our invention. For example, the portions A and B of the attachment could be constructed in such a way that each thereof would resemble one-half of an elongated pipe whereby the pipe would be opened up in a plane passing through or in parallelism with its axis when the operators desire to introduce a fresh blank. This amounts to respectively replacing the guide bars 18, 20 and 22, 24 by two trough-shaped guide members or half tubes 200, 201 which, when moved together, form a complete tube or pipe capable of accommodating a workpiece or blank of a given diameter. Nevertheless, the construction shown in FIGS. 1 to 4 is preferred for most applications because the guide rails 18, 20, 22 and 24 can be readily adjusted to properly accommodate blanks of widely different diameters. In other words, while pipe-like guide assembly of FIG. 6 might necessitate replacement if the attachment is to be used for feeding blanks of widely different diameters, the guide assembly including the bars 18, 20, 22 and 24 may be constructed in such a way that it can accommodate blanks of exceptionally large as well as blanks of exceptionally small diameter. Of course, the guide assembly of our attachment can be readily utilized or adapted for feeding of elongated blanks which need not be of circular cross section.

It is also clear, that one of the guide bars 22, 24 could be omitted and that the remaining one of these bars could be placed into a plane which is vertical when the second portion B is moved to the closing position of FIG. 3.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. An attachment for feeding elongated rods and similar blanks to turning lathes and other types of machine tools, comprising an elongated guide assembly including a fixed portion and a second portion movable with reference to said fixed portion between two positions, said portions defining between themselves an elongated blank-receiving channel when said second portion is moved to one of said positions and said channel being exposed in response to movement of said second portion to the other position so that a blank may be placed into said channel; feeding means carried by said second portion and extending into said channel in the one position of said second portion; and advancing means including a motion transmitting member engaging said feeding means in the one position of said second portion and arranged to shift the feeding means in said channel to thus advance the blank.

2. An attachment for feeding elongated rods and similar blanks to turning lathes and other types of machine tools, comprising an elongated guide assembly including a fixed portion and a second portion coupled to and movable with reference to said fixed portion between two positions, said portions defining between themselves an elongated blank-receiving channel when said second portion is moved to one of said positions and said channel being exposed in response to movement of said second portion to the other position so that a blank may be placed into said channel to be supported by said fixed portion; feeding means carried by said second portion and extending into said channel in the one position of said second portion; and advancing means including a motion transmitting member engaging said feeding means in the one position of said second portion and arranged to shift the feeding means in said channel to thus advance the blank.

3. An attachment for feeding elongated rods and similar blanks to turning lathes and other types of machine tools, comprising an elongated guide assembly including a fixed portion and a second portion movable with reference to said fixed portion between two positions, said portions defining between themselves an elongated blank-receiving channel when said second portion is moved to one of said positions and said channel being exposed in response to movement of said second portion to the other position so that a blank may be placed into said channel, each of said portions comprising carrier means, at least one elongated guide member adjustably mounted on the respective carrier means and extending in the longitudinal direction of said channel, and adjusting means for changing the position of the guide member with reference to the corresponding carrier means; feeding means carried by said second portion and extending into said channel in the one position of said second portion; and advancing means including a motion transmitting member engaging said feeding means in the one position of said second portion and arranged to shift the feeding means in said channel to thus advance the blank.

4. An attachment as set forth in claim 3, wherein said guide assembly comprises more than two guide members and wherein all of said guide members are equidistant from each other in said one position of the second portion, each of said guide members being adjustable in directions radially of said channel so that the channel may accommodate blanks of different cross section.

5. An attachment for feeding elongated rods and similar blanks to turning lathes and other types of machine tools, comprising an elongated guide assembly including a fixed lower portion and an upper portion hinged to said lower portion and pivotable between two positions in one of which said portions define an elongated blank-receiving channel and in the other of which said channel is exposed so that a blank may be placed into the channel to rest on said lower portion, each of said portions comprising a pair of elongated guide members extending in the longitudinal direction and radially of said channel, said guide members being equidistant from each other in said one position of the upper portion and each of said guide members engaging and guiding the blank when the upper portion is moved to said one position; feeding means reciprocably carried by said upper portion and extending into said channel in the one position of said upper portion; and advancing means comprising a motion transmitting member engaging said feeding means in said one position of said upper portion and arranged to shift the feeding means in said channel to thus advance the blank.

6. An attachment for feeding elongated rods and similar blanks to turning lathes and other types of machine tools, comprising an elongated guide assembly including a fixed portion and a second portion movable with reference to said fixed portion between two positions, said portions defining between themselves an elongated blank-receiving channel when said second portion is moved to one of said positions and said channel being exposed in response to movement of said second portion to the other position so that a blank may be placed into said channel to be supported by said fixed portion; feeding means extending into said channel in the one position of said second portion; attaching means reciprocably securing said feeding means to said second portion so that said feeding means is movable in the longitudinal direction of said channel; and advancing means including a motion transmitting member engaging said feeding means in the one position of said second portion and arranged to shift the feeding means in said channel to thus advance the blank.

7. An attachment for feeding elongated rods and similar blanks to turning lathes and other types of machine tools, comprising an elongated guide assembly including a fixed portion and a second portion hinged to and pivotable with reference to said fixed portion between two positions about a fixed axis which is substantially parallel to the longitudinal extension of said guide assembly, said portions defining between themselves an elongated blank-receiving channel when said second portion is moved to one of said positions and said channel being exposed in response to movement of said second portion to the other position so that a blank may be placed into said channel; feeding means carried by said second portion and extending into said channel in the one position of said second portion; and advancing means including a motion transmitting member engaging said feeding means in the one position of said second portion and arranged to shift the feeding means in said channel to thus advance the blank.

8. An attachment as set forth in claim 7, further comprising means for locking said second portion in at least one of said positions.

9. An attachment for feeding elongated rods and similar blanks to turning lathes and other types of machine tools, comprising an elongated guide assembly including a fixed portion and a second portion movable with reference to said fixed portion between two positions, said portions defining between themselves an elongated blank-receiving channel when said second portion is moved to one of said positions and said channel being exposed in response to movement of said second portion to the other position so that a blank may be placed into said channel; feeding means carried by said second portion and extending into said channel in the one position of said second portion; and advancing means including a chain having a stringer extending along said guide assembly, reversible motor means for driving said chain, and motion transmitting means attached to said stringer and engaging said feeding means in said one position of said second portion to shift the feeding means in said channel and to thus advance the blank when said motor means drives said chain in one direction.

10. An attachment as set forth in claim 9, wherein said feeding means comprises an elongated shaft reciprocably coupled to said second portion and wherein said second portion is hingedly coupled to said fixed portion so as to be pivotable about a fixed axis which is substantially parallel with said channel, said shaft having an annular groove and said motion transmitting means comprising an arm extending into said groove to couple said shaft to said chain when the second portion is moved to said one position.

11. An attachment as set forth in claim 10, wherein said portions define between themselves an elongated slot when said second portion is pivoted to said one position, said slot being parallel to and communicating with said channel and said arm extending through said slot and into the groove of said shaft.

12. An attachment as set forth in claim 9, wherein said motor means is arranged to shift said feeding means in stepwise fashion and further comprising regulator means for reversing the motor means subsequent to each stepwise advance of the blank so that said feeding means is moved away from the blank.

13. An attachment as set forth in claim 12, wherein said advancing means further comprises valve means operative to control said motor means and actuating means mounted on said chain to operate said valve means in predetermined positions of said motion transmitting means.

References Cited

UNITED STATES PATENTS

| | | | |
|---|---|---|---|
| 675,241 | 5/1901 | Pederson | 308—65 |
| 2,108,274 | 2/1938 | Tautz et al. | 214—1.5 |
| 2,670,251 | 2/1954 | Tribbett | 308—4 |
| 3,041,904 | 7/1962 | Konrad | 214—1.2 |

FOREIGN PATENTS

| | | |
|---|---|---|
| 850,300 | 10/1960 | Great Britain. |

GERALD M. FORLENZA, *Primary Examiner.*

MARVIN A. CHAMPION, *Examiner.*